(12) United States Patent
Sundermier (10) Patent No.: US 6,484,214 B1
(45) Date of Patent: Nov. 19, 2002

(54) METHOD FOR DISTRIBUTED OBJECT COMMUNICATIONS BASED ON DYNAMICALLY ACQUIRED AND ASSEMBLED SOFTWARE COMPONENTS

(75) Inventor: Amy Sundermier, Apache Junction, AZ (US)

(73) Assignee: McDonnell Douglas Helicopter Company, Mesa, AZ (US)

( * ) Notice: Subject to any disclaimer, the term of this patent is extended or adjusted under 35 U.S.C. 154(b) by 0 days.

(21) Appl. No.: 09/035,202

(22) Filed: Mar. 5, 1998

(51) Int. Cl.[7] .............................................. G06F 9/00
(52) U.S. Cl. ...................................... 709/332; 717/165
(58) Field of Search ................................. 709/203, 332, 709/221, 219, 310, 331; 717/2, 162, 165, 167; 707/10

(56) References Cited

U.S. PATENT DOCUMENTS

| | | | |
|---|---|---|---|
| 5,339,430 A | * | 8/1994 | Lundin et al. ............... 709/332 |
| 5,347,632 A | | 9/1994 | Filepp et al. |
| 5,365,606 A | | 11/1994 | Brocker et al. |
| 5,548,724 A | | 8/1996 | Akizawa et al. |
| 5,568,612 A | | 10/1996 | Barrett et al. |
| 5,572,643 A | | 11/1996 | Judson |
| 5,579,222 A | | 11/1996 | Bains et al. |
| 5,659,683 A | | 8/1997 | Kawano et al. |
| 5,659,751 A | * | 8/1997 | Heninger .................... 709/332 |
| 5,761,499 A | * | 6/1998 | Sonderegger ................ 707/10 |
| 5,768,510 A | * | 6/1998 | Gish .......................... 709/203 |
| 5,790,796 A | * | 8/1998 | Sadowsky ................... 709/221 |
| 5,845,119 A | * | 12/1998 | Kozuka et al. ................. 717/2 |
| 5,918,015 A | * | 6/1999 | Suzuki et al. ................ 709/219 |

FOREIGN PATENT DOCUMENTS

| | | |
|---|---|---|
| EP | 0 817 035 A2 | 1/1998 |
| WO | WO 97/00475 | 1/1997 |
| WO | WO 97/22925 | 6/1997 |

OTHER PUBLICATIONS

PCT/US99/04144 Search Report.
The Emergence of Distributed Component Platforms by Krieger et al.; "Computer" Mar. 1998 pp. 43–53.

* cited by examiner

*Primary Examiner*—St. John Courtenay, III
*Assistant Examiner*—Van Hoa Nguyen
(74) *Attorney, Agent, or Firm*—Stout, Uxa, Buyan & Mullins, LLP; Donald E. Stout; Kenton R. Mullins (57) ABSTRACT

A method for acquiring and assembling software components at execution time into a client program, where the components may be acquired from remote networked servers is disclosed. The acquired components are assembled according to knowledge represented within one or more acquired mediating components. A mediating component implements knowledge of an object model. A mediating component uses its implemented object model knowledge, acquired component class information and polymorphism to assemble components into an interacting program at execution time. The interactions or abstract relationships between components in the object model may be implemented by the mediating component as direct invocations or indirect events or software bus exchanges. The acquired components may establish communications with remote servers. The acquired components may also present a user interface representing data to be exchanged with the remote servers. The mediating components may be assembled into layers, allowing arbitrarily complex programs to be constructed at execution time.

30 Claims, 9 Drawing Sheets

METHOD FOR DISTRIBUTED OBJECT COMMUNICATIONS BASED ON DYNAMICALLY ACQUIRED AND ASSEMBLED SOFTWARE COMPONENTS

The invention described herein was made in the performance of work under NASA Cooperative Agreement No. NCCW-0076 and is subject to the provisions of Section 305 of the National Aeronautics and Space Act of 1958 (42 U.S.C. 2457).

BACKGROUND OF THE INVENTION

1. Field of the Invention

The present invention relates generally to compositional software and, more particularly, to methods for dynamically acquiring and assembling software components in distributed object environments.

2. Description of the Related Art

Recently there has been a growing interest in the area of "Compositional Software," which refers to software that is assembled from components. Proponents of this technology envision a future where software engineers assemble applications from catalogs of software components, similar to the way that hardware engineers design boards by selecting integrated circuits from catalogs. The goal of building applications by assembling components is to simplify software development so that average programmers do not have to be extensively educated or exceptionally skilled. An anticipated shortage of software engineers and programmers in the future means that software should be made easier and quicker to build to meet the demand for ever more sophisticated and flexible applications.

In the prior art, application-build environments were operating system dependent, because the GUI components generated were mapped to services supported by the windowing system. With the introduction of Java, a language designed to run on any hardware platform and on any operating system, components can now be generated that will work on any system with the Java Virtual Machine. The Java Virtual Machine provides a runtime environment for Java that shields the Java program from the idiosyncrasies of any given operating system. The Java program extends standard classes to implement objects, and inherited code from standard base classes is written to function the same on all platforms. The Java environment guarantees that a Java application written with components will work the same no matter where it is run. This is necessary particularly for the World Wide Web (WWW) environment, where the client may be any computer that has a browser.

The Common Object Request Broker Architecture (CORBA) is a conventional technology that allows objects within distributed object-oriented programs to invoke methods remotely. The significance of this technology is that distributed programs may be written as if all the objects were located in the same process space, so that the programming becomes simpler using CORBA compared to previously available distributed techniques. In addition, CORBA supports language and operating system independent remote method invocation, allowing the client to perform method invocations on server objects written in different languages or running on different platforms. CORBA provides networking independence the way that the Java Virtual Machine provides operating system independence.

Distributed object-oriented (OO) programs based on CORBA allow general purpose applications to be developed across multiple heterogeneous systems and databases. Frequently, CORBA servers are used to put an object-oriented front end on a legacy system or database. The details of interacting with the legacy system are encapsulated within the CORBA server's objects so the client can be written more simply. Distributed OO programs can integrate a corporation's existing software much faster than rewriting the legacy systems, so the benefits of an integrated software environment or data warehouse can be achieved without investing years in developing a new version of business-critical applications.

CORBA objects are statically located on the server. Clients access the CORBA object's data and behavior by remote method invocations. The client obtains a reference to a remote CORBA object, and then interacts with the CORBA object. This programming style works very well for providing an object-oriented interface to a non-OO legacy system, because the legacy system is encapsulated by the CORBA objects on the server.

Combining Java with CORBA provides an incredibly powerful programming environment. CORBA provides cross-language support, which is very important for interacting with legacy systems and servers in other languages. Java provides portability and mobility. Portability allows Java programs to be run on any system having a Java Virtual Machine. Mobility allows the programs to be downloaded on demand.

Java software offers portability, which allows the software to run on any platform. When Java applets are combined with remote method invocation, then some very interesting web-based applications can be built. A Java graphical frontend can communicate with object-oriented servers using CORBA or the Java-to Java Remote Method Invocation (RMI). Now the Java client can provide access to data such as airline reservation systems or control remote devices such as large telescopes or roaming unmanned vehicles. The client uses remote method invocations to interact with a server, and the server may encapsulate a legacy system, a database, or any arbitrary computer-controlled function.

The advantage here is that the portability and mobility of Java applets makes it possible to give virtually anyone access to the application who has access to the Internet. The back-end server is still controlled, maintained, and upgraded by programmers and administrators physically close (usually) to the database or computer-controlled equipment.

An interesting and useful feature of object-oriented software is the ability of an object to masquerade as different types. This feature is called "polymorphism." There are restrictions to this ability, and the restrictions are set by the class hierarchies to which the object belongs. The ability of an object to masquerade as another type is determined by the class hierarchy(ies) to which the object belongs. An object can only masquerade as a superclass of the object's class. Hierarchies allow classes to be constructed that are subtypes or refinements of existing classes.

An object-oriented system may be represented by an Object Model. An Object Model is a graphical picture used by software designers to describe the classes of objects in the system and the interactions between the objects. Graphical modeling languages such as Unified Modeling Language (UML) are well-known in the object-oriented industry for describing the classes of objects, attributes, operations and relationships. The object model is a design. The source code for an object implements the interaction with another object by referring to the object's attribute values or calling operations. The interactions are determined at design time and fixed at compile time.

SUMMARY OF THE INVENTION

A method for distributed object communications based on dynamically acquired and assembled software components is disclosed. This invention provides a method for incrementally acquiring additional software components which can then be assembled according to the logic represented within one or more mediating components. The acquired components may then initiate communications with remote servers and/or may provide a component-specific user interface.

The present invention includes three main features. First, components are written in a language that supports portability, polymorphism and mobility so that they may be acquired via downloading from one or more networked servers, databases or file systems and instantiated prior to being assembled. Second, mediating component(s) provide implementation of the knowledge representation of the interactions of other components therefore assuming responsibility for coordinating interactions between the acquired and assembled components. Third, the components acquired may then initiate communications with remote servers and/or provide a user interface.

The present invention, together with additional features and advantages thereof, may best be understood by reference to the following description taken in connection with the accompanying illustrative drawings.

DETAILED DESCRIPTION OF THE PRESENTLY PREFERRED EMBODIMENTS

Referring now more particularly to the drawings, FIGS. 1–11 illustrate exemplary implementations of the present invention. The present invention presumes the existence of computers, networks, computer languages, and networking protocols. The physical configuration of the computer or network, the computer operating system, networking protocols and computer languages are relatively unimportant as long as they support the technology needed for the invention to function correctly. Someone skilled in the art would understand that this invention may be applied to other environments and configurations than the ones described within the exemplary FIGS. 1–11. For example, the present invention could function over wireless networks, or for computers without data storage devices. The figures described within this document are not exhaustive of all possible ways in which the invention may be applied, but illustrate a presently preferred embodiment and typical uses which can be understood by someone skilled in the field of object-oriented computer languages and distributed communications technology. The terms given to the participating entities within the figures were chosen for illustrative purposes only, and someone skilled in the art would understand that the terms shown in the figures do not limit the invention.

The term "client" refers to any executing program which requests or receives data from an external source, and the term "server" refers to the external source supplying the data. An external source may be on the same physical computer or may be accessed over a network connection. External sources include databases, file systems, networked servers such as CORBA or RMI servers, or typically any source not located within the client process's addressable virtual memory space. A program may function as both client and server, depending on its role in a communication exchange.

Objects do not randomly interact in an object-oriented system. Their interactions are predefined by an Object Model. As explained previously, in the prior art an Object Model is a graphical representation of the interactions between classes of objects in an object-oriented system. The Object Model is a picture that helps software designers describe the way in which objects will interact. In a prior art object-oriented system the knowledge represented in the Object Model is embedded into the code of each of the objects in the system. The objects in the system refer to each other's methods and properties directly, and this direct referencing among objects is the way interactions between the objects occur.

Although the prior art views an Object Model as a useful picture to describe the code a programmer should write, the present invention views an Object Model for a system as a knowledge representation for the application program. In accordance with the present invention, an Object Model describes the types of objects allowed in the system and the way the objects can interact with each other. By building an object-oriented system differently, one can make some great leaps in flexibility. A system can be implemented in accordance with the present invention by creating an object that represents the knowledge of the Object Model, which will be referred to as a Mediator Component.

The Mediator Component contains all relevant knowledge of the way components interact in the system. All of the other components in the system will communicate with the Mediator Component, and the Mediator Component will disseminate information or directions in the form of messages or operation calls to the other components as needed. The components in the system no longer refer directly to each other, but instead have knowledge and interactions only with the Mediator Component.

Primarily, in accordance with the present invention, components do not have to know about each other or make assumptions about each other. The Mediator Component assumes all responsibility for creating and managing the components necessary to perform the function or functions modeled by the Mediator Component's knowledge.

The Mediator Component is to some extent a special type of component. A comparison can be made between software component-based engineering and hardware engineering where an Electrical Engineer chooses integrated circuit (IC) chips from a catalog and plugs them into a circuit board. Modem hardware engineering designing techniques have helped to speed up the process of designing hardware a great deal. Using this analogy, the Mediator Component as described within the context of the present invention is in some ways analogous to the circuit board of hardware design. The circuit board provides the interactions between ICs in the form of circuit connections or signals, and the Mediator Component describes the interactions between components in the form of method calls or messages. Continuing with this analogy, consider that a circuit board to do the same function may be supplied by a different vendor. The new vendor may have combined different ICs in a different way on its circuit board, but the circuit board may be interchangeable with the previous manufacturer's circuit board if the same function is performed and the same external interfaces are supported. In a similar way, a Mediator Component may be replaced with a different Mediator Component that performs the same function. In other words, Mediator Components of the present invention can also be subclasses or subtypes. This means that the logic of the interactions between components in a system, the Object Model, can be represented by one or more Mediator Components in the system. Further, the Object Model can be replaced at execution time depending upon which Mediator Component is invoked. And because of polymorphism, the invoking component doesn't have to know which subclass of Mediator is being used to perform the function.

The Mediator Component represents the knowledge of how components interact to form a system. An object-oriented program treats a Mediator Component like any other object. The objects managed by the Mediator Component may themselves be Mediator Components. A complex system may be built from layers of Mediator Components, where each layer represents a subset of knowledge of how components interact to perform a function. The knowledge can be partitioned so that the interactions between Mediator Components are no more complex than the interactions between regular components. The encapsulation of knowledge and interactions may be partitioned itself so that the entire Object Model is not represented by one Mediator Component in a complex system. The Mediator Component chosen at execution time for each function may be chosen by the context of the execution environment or may be chosen by the user or by other factors. The program is therefore dynamically constructed from components that come together at execution time, possibly from many different remote servers or databases. The mobility of Java (or future languages) is essential in accordance with the present invention to support this dynamic construction from networked and distributed systems.

The present invention implements a novel approach of using the mobility of Java to construct programs dynamically. An applet in accordance with the present invention can load additional classes and instantiate new objects during execution. Methods can then be executed on the newly instantiated objects. This approach allows a Java program to add code to itself by loading and invoking newly created objects. Since the new objects may then repeat the process, loading and invoking additional objects again, the evolving program that is executed may bear little resemblance to the program that was originally downloaded from the web server.

The present invention recognizes, however, that in order to perform a useful function, a program cannot randomly change. There must be some knowledge guiding the creation and invocation of the objects making up the evolving program. The mobility of Java is an important aspect of the present invention, because a Java environment provides the ability for a program to acquire and assemble components dynamically at execution time. The Mediator Component(s) of the present invention make the resulting assembly of components meaningful and useful in carrying out some function. The present invention combines code mobility with Mediator Components to provide a mechanism for dynamically acquiring and assembling components at execution time in a meaningful way.

In the prior art a Design Pattern is an abstract description of the way a group of cooperating objects can be used to solve a problem. A Mediator pattern, which is a conventional type of design pattern, comprises an abstract description or recommendation of an object managing interactions between a group of interrelated objects so that the individual objects do not have to directly refer to one another. A problem of managing complex interactions between objects is addressed by the Mediator pattern.

A Mediator pattern of the prior art can be defined as a graphical diagram presenting an abstract recommendation. The Mediator Component of the present invention, on the other hand, is an actual component that represents the knowledge of an Object Model. Moreover, the Mediator Component of the invention comprises source code which is implemented to represent the knowledge.

Mediator Components in accordance with the present invention contain the knowledge of the system. The Mediator Components of the present invention can have additional roles as well. For example, Mediator Components of the present invention may have to verify that a component they intend to use to fill a role will actually support all of the required interactions. Before blindly accepting a component for a role, a Mediator Component may have to examine the component to see what interactions it generates or supports. Techniques have existed in some object-oriented systems or languages for providing examination capabilities. Reflection and Introspection are conventional techniques or concepts which relate to the ability of a system to examine the interface of an object or component dynamically at runtime and to actually interact with the object or component based on the information gained from examination. These capabilities can be used by Mediator Components to verify that given components provide the methods needed for interaction with other components in the Mediator Component's Object Model. A Mediator Component can also adapt somewhat to a component based upon the information discovered. The power of Introspection and Reflection are preferred in accordance with the present invention for truly robust and flexible dynamic systems. Using these techniques, Mediator Components of the present invention are not limited to the flexibility provided by polymorphism alone.

The Mediator Component or components of the present invention are used to represent the Object Model for the system. The addition of a dynamically downloadable representation of the knowledge of the system in the form of one or more Mediator Components, in accordance with the present invention, makes dynamic assembly of components possible. The Mediator Component can acquire and assemble Java Components from many different remote servers. These Java Components can then contact CORBA servers for remote communication and services and can also provide interactions with the user in the form of graphical windows and widgets. Since the Mediator Component is a Java Component itself, it can be dynamically acquired and downloaded as well, allowing the user to control the way the functions are implemented by components. The flexibility provided by the combination of polymorphism, mobility, remote invocation, reflection and introspection, and knowledge representation, in accordance with the present invention, provides the ability to create software on-the-fly. A user is no longer bound by the decisions made at design time by a programmer. Code can be acquired at execution time and examined for suitability of use for a particular role. In accordance with the present invention, code can be combined in ways unforeseen by the programmers as long as the desired interactions for the roles are supported. Even Mediator Components can be acquired and combined in unforeseen ways, so that software can be dynamically constructed without a programmer from component repositories or catalogs.

Figure 1:
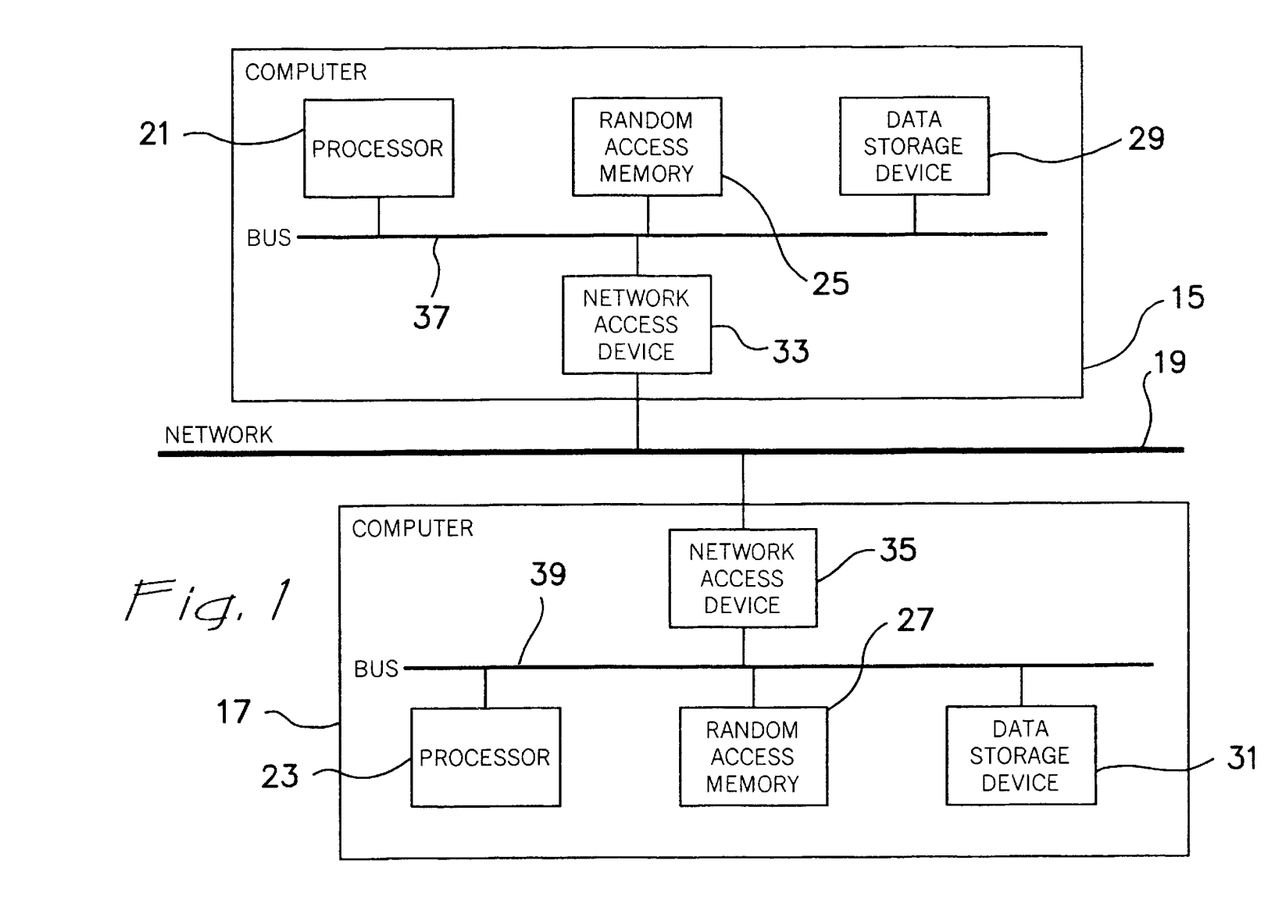
FIG. 1 is an illustration of two networked computers which may be used with the present invention.

FIG. 1 illustrates two computers 15, 17 connected by a network 19. The computers 15, 17 are shown having processors 21, 23, random access memories 25, 27, data storage devices 29, 31 and network access devices 33, 35 all connected internally by respective buses 37, 39. The network access devices 33, 35 provide the capability of transmitting to and receiving data from other computers connected to the network 19 and communicating by the same protocol. The invention described herein was developed for use with multiple computers connected on a network. Although only two computers 15, 17 are shown in this figure, the present invention does not require more than one computer or restrict the maximum number of computers which may participate.

Figure 2:
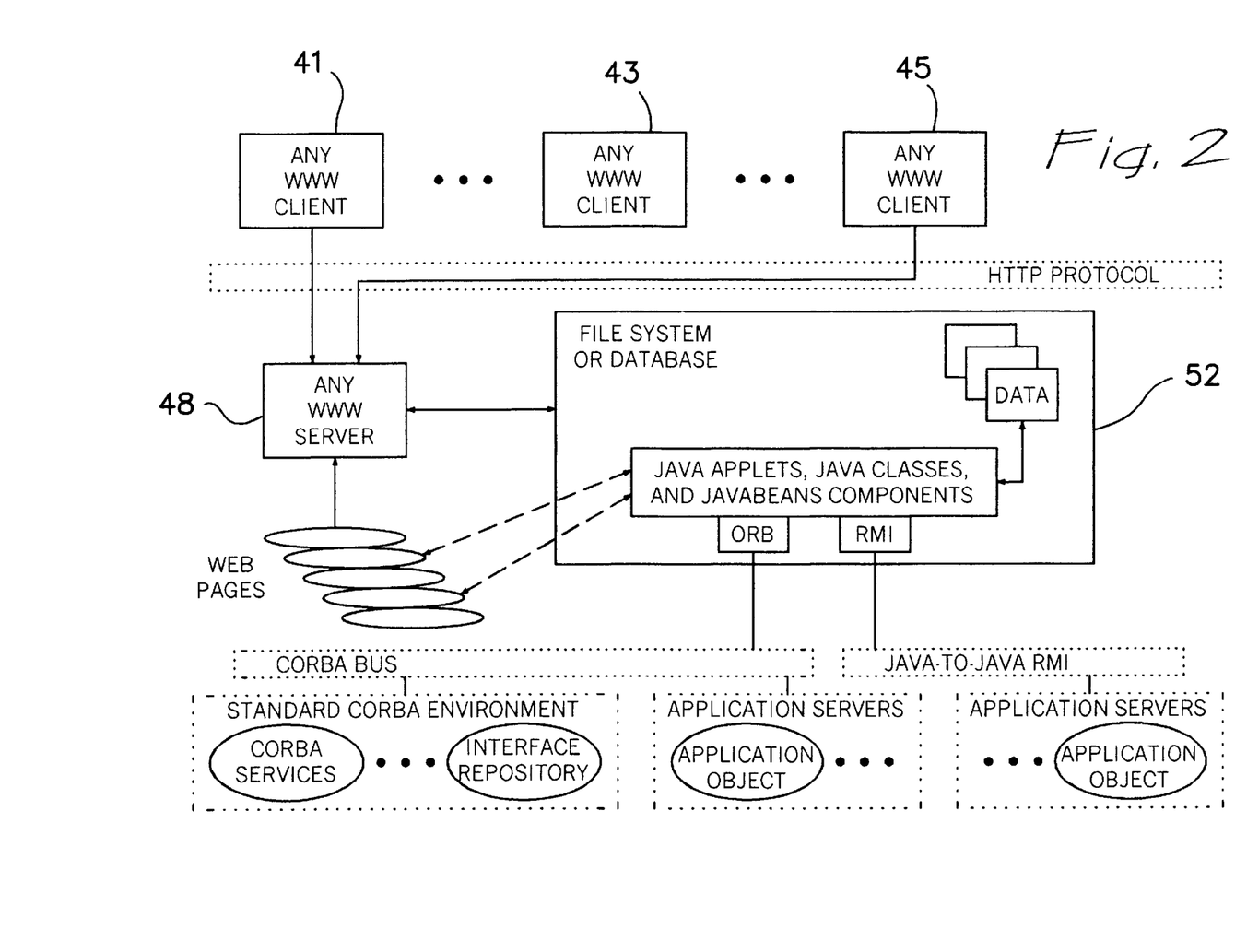
FIG. 2 is an illustration of an environment which may be used with the present invention.

FIG. 2 illustrates a typical environment of use of the invention. The boxes 41, 43, 45 labeled "Any WWW Client" represent client computers on the Internet that may use web browsers to access web pages. The communication protocol used in this example for web page access and retrieval is HyperText Transfer Protocol (HTTP). The box 48 labeled "Any WWW Server" represents computers on the Internet that serve web pages and related data to the client computers 41, 43, 45. A web page may contain a reference to a Java applet that will be downloaded when the web page is downloaded. The block 52 labeled "File System or Database" shows that Java programs, classes, and components like JavaBeans may be accessed from a web server's file system or from a database. The Java program, after being downloaded to the client computer, may access data from the file system or database 52. The Java program may also establish communications with remote object servers using an Object Request Broker or Java-to-Java Remote Method Invocation (RMI).

This figure shows one possible environment for implementation of the present invention. The choices illustrated in FIG. 2 such as Java, CORBA, RMI, HTTP, and so on, are not the only choices of technology that may be combined to form an environment for implementation of the invention. Other choices may provide an equally valid environment so long as the environment provides a mechanism for transferring an initial client-executable program such as a Java Applet to the client computer from a remote server such as an Internet web server, the client program is written in a language that can incrementally find and incorporate within the executing program additional components from networked resources, and the incrementally acquired components can interface with networking protocols or distributed object middleware like CORBA to provide a mechanism for component-based communication with remote servers.

Figure 3:
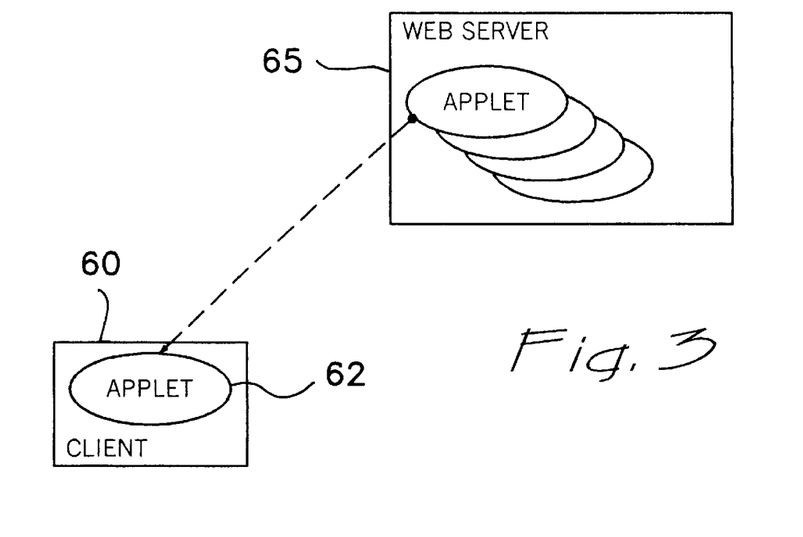
FIG. 3 is an illustration of an initial step of the invented process when a client computer acquires a program from a server.

FIG. 3 illustrates one of the first steps of the method of the presently preferred embodiment. The client program or computer 60, which generally corresponds to one of the client computers 41, 43, 45 of FIG. 2, acquires a starting or initializing component, represented in this example by a Java Applet 62 downloaded from a web server 65, which generally corresponds to the web server 48 of FIG. 2. An important point illustrated by FIG. 3 is that the environment must support the ability for a client 60 to acquire a downloaded software component 62 from a server 65. The choice of computer language is relatively unimportant in the presently preferred embodiment, as long as the language chosen shares characteristics with Java such as mobility, portability and polymorphism.

Figure 4:
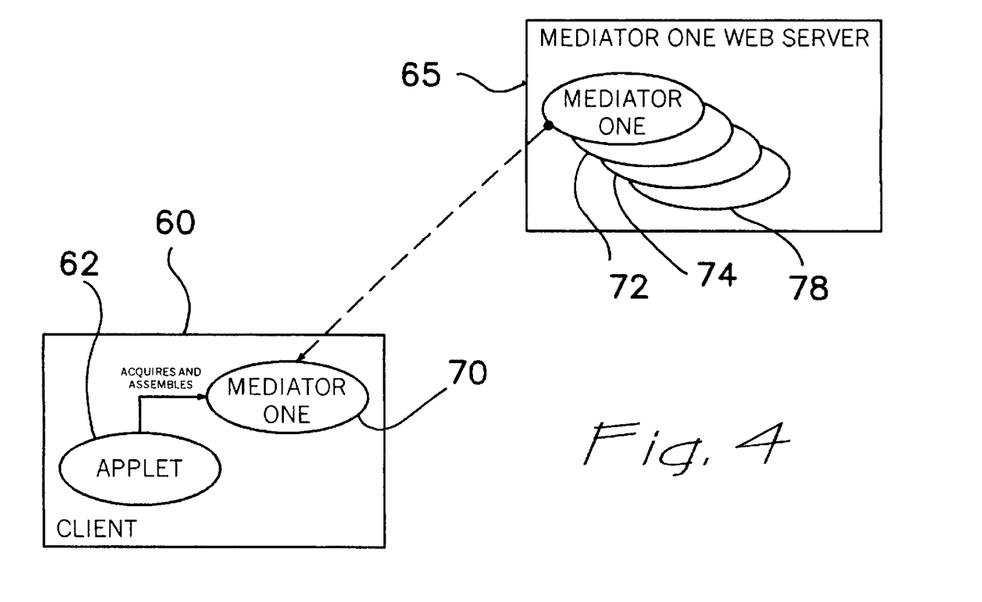
FIG. 4 is an illustration of dynamically acquiring a mediating component, Mediator One.

FIG. 4 illustrates a subsequent step in the process of the present invention. The downloaded program from FIG. 3, in this example a Java applet 62, now acquires a new component. In this example, the newly acquired component is named Mediator One 70. In the presently preferred embodiment the Applet 62 acquires one and only one mediating component 70 before continuing to the next step in the process. Someone skilled in the art would recognize that the Applet 62 and Mediating component 70 may be combined into the same component in a simple system, allowing the Applet 62 to function as a Mediator Component. One skilled in the art would also recognize that the Applet 62 may acquire an unrestricted number of components before continuing to the next step in the process of the presently preferred embodiment. This figure shows a simple example for clarity.

The web server 65 for the mediating component 70 is shown here with multiple additional components 72, 74, 78. In the process of acquiring components, the Applet 62 may contact multiple servers and download components from an unrestricted number of servers.

Figure 5:
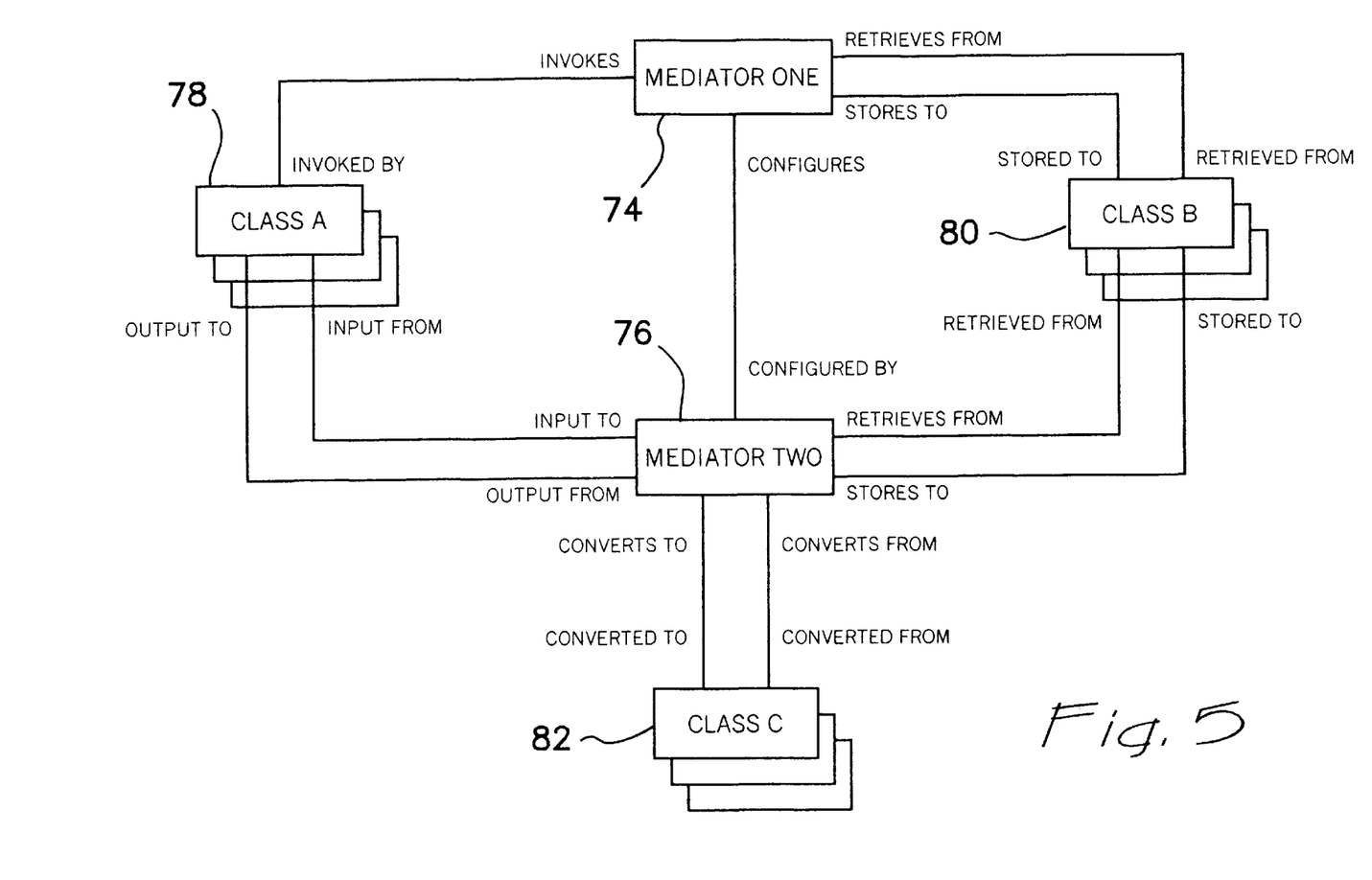
FIG. 5 is an illustration of the Object Model implemented by the Mediator One component.

FIG. 5 provides an exemplary Object Model for purposes of demonstration only. This figure does not directly demonstrate a step in the process of the present invention. The purpose of a Mediator Component is to arbitrate or mediate interactions between other components in the system. Since the continued illustration of an exemplary use of the present invention requires a choice of an arbitrary Object Model, the rest of the example will make use of this arbitrary choice. One skilled in the art would recognize that this choice of object model is arbitrary and not singularly or particularly important or limiting with respect to the present invention described and illustrated herein. An important point illustrated by this figure is that the Mediator Component implements the knowledge represented by an Object Model to control and mediate component interactions. The Object Model which is implemented depends upon the desired function of the Mediator Component in the context of a particular application of the invention, but the invention itself does not depend on the specific Object Model chosen by the application programmer.

The Object Model chosen for Mediator One component 70 includes one instantiation of a Mediator One 74 and Mediator Two 76 class or subclass component, and optionally multiple instantiations of Class A 78, Class B 80, and Class C 82 class or subclass components. The relationships shown within the object model are implemented within the Mediator One component 70, as will be explained subsequently with reference to the following figures. The term "instantiation" refers to a process of filling in the template of a generic or parameterized class to produce a class from which one can create instances. An "instance" is defined as something to which things can be done. An instance is defined as having state, behavior, and identity. The structure and behavior of similar instances are defined in their common class. The terms "instance" and "object" are generally interchangeable.

Figure 7:
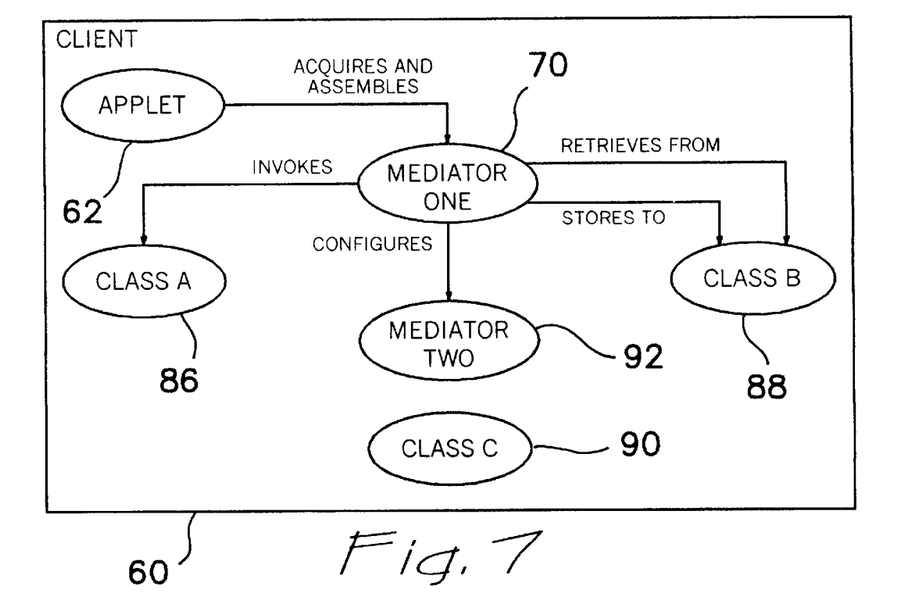
FIG. 7 is an illustration of relationships from the Object Model implemented by Mediator One as direct method invocations on assembled components.
Figure 8:
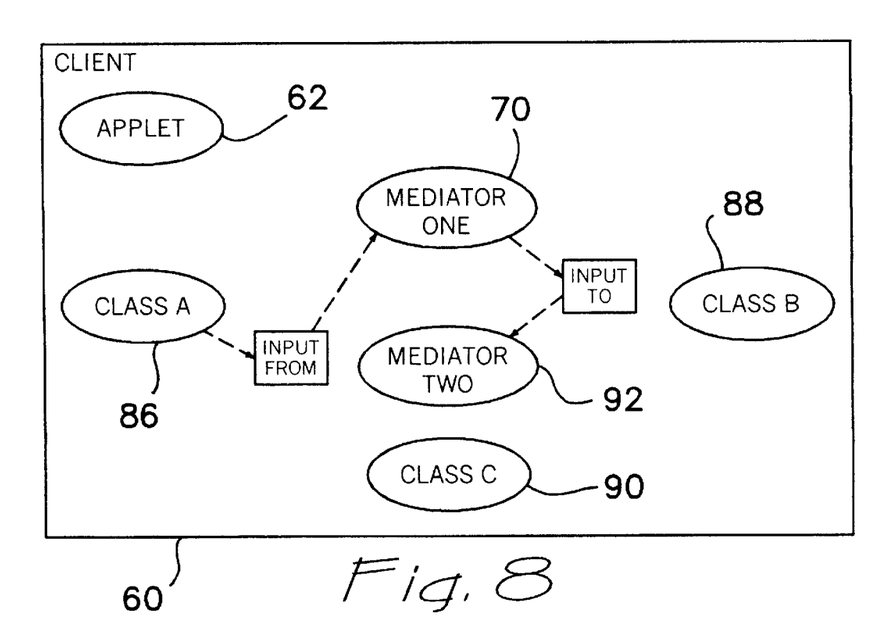
FIG. 8 is an illustration of a relationship between two components from the Object Model implemented by Mediator One as events.
Figure 9:
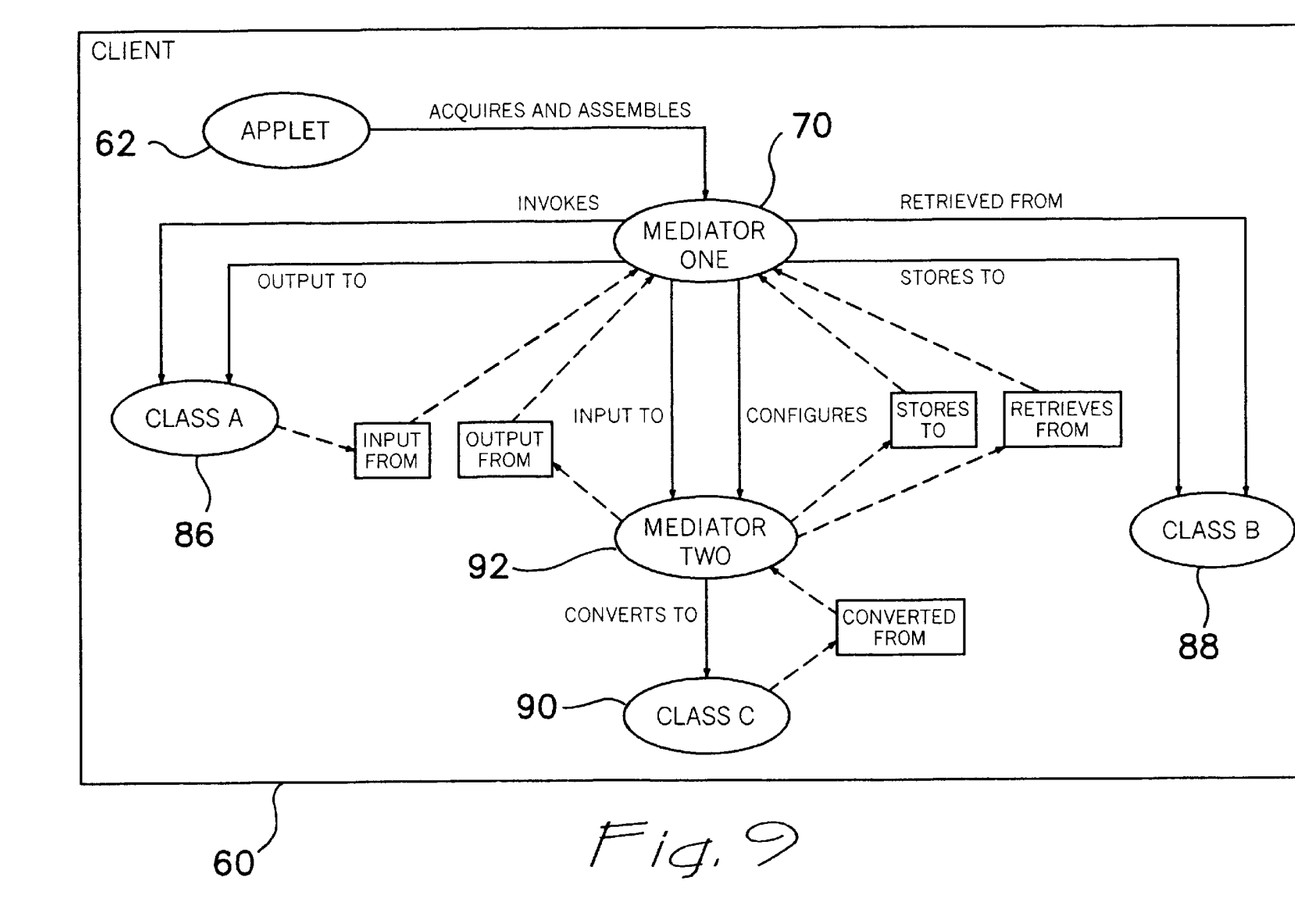
FIG. 9 is an illustration of the Object Model relationships implemented within the Mediator One components as method invocations and events.

Components are shown in the Object Model in FIG. 5 by rectangular boxes labeled with their respective class names. Components are top-level concepts in the Object Model, and each component may actually be implemented by multiple objects that are not visible outside the boundaries of the component's public interface. Relationships are shown in the Object Model as lines connecting components, and illustrate the possible abstract interactions between components. The labels on the relationship lines show the role played by the component in the interaction. For example, Mediator One components 74 may invoke Class A components 78. Class A components 78 may be invoked by Mediator One components 74. The interactions may be implemented in many different ways as illustrated in FIGS. 7, 8 and 9. The relationships shown in FIG. 5 are abstractions. FIGS. 7, 8, and 9 illustrate choices of particular mechanisms for implementing the abstract interactions of FIG. 5.

Figure 6:
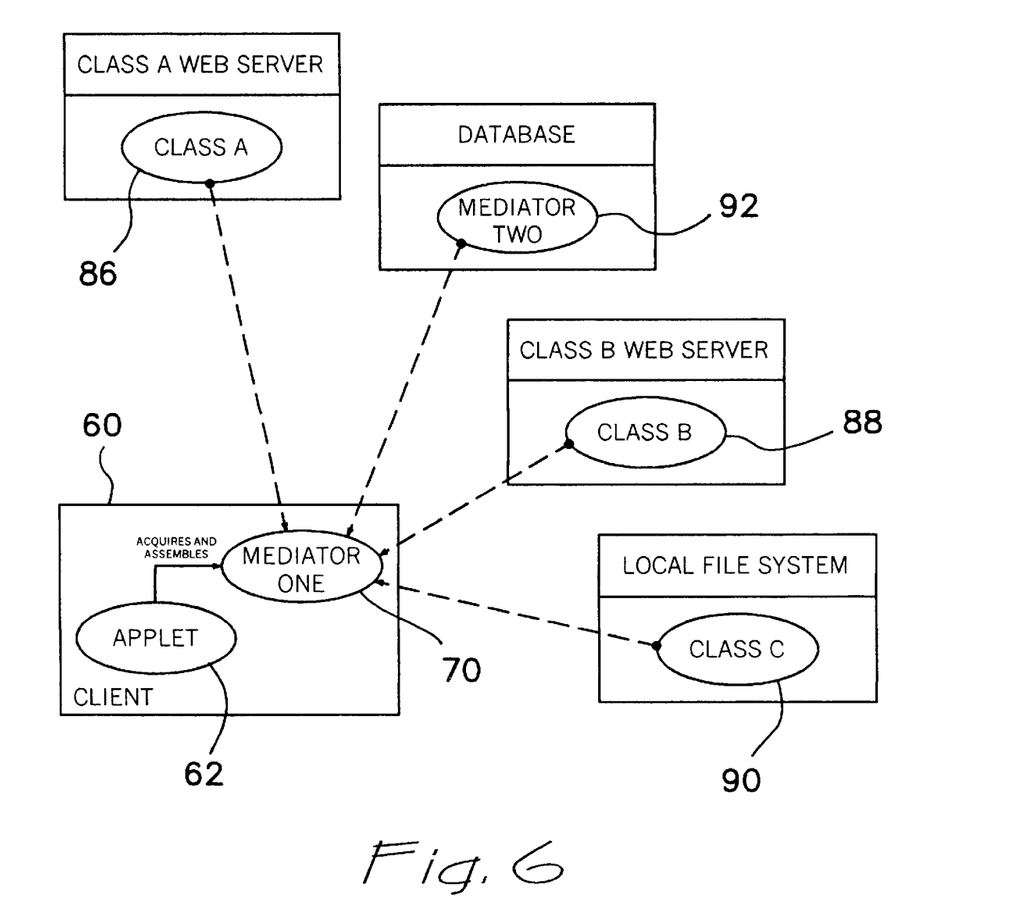
FIG. 6 is an illustration of the Mediator One component dynamically acquiring components representing classes or subclasses from the Object Model.

FIG. 6 illustrates a subsequent step in the process of the present invention, based upon the arbitrary Object Model chosen for the Mediator One component 70. The Mediator One component 70 now acquires components representing the classes in its Object Model. The components acquired may be chosen at the same or different times under user direction, preprogrammed logic, database query results, or other mechanisms. An important point illustrated in FIG. 6 is that components representing the classes are chosen by some mechanism and are preferably acquired from servers. The example shows only one Class A component 86, one Class B component 88, and one Class C component 90 being acquired, but this is an arbitrary choice for illustrative purposes only. The example also shows the components being acquired from different locations such as web servers, database or local file systems, but this is not necessary if, for example, one location can serve multiple classes of objects. The example also shows a component of each class in the Object Model being acquired, but there is no absolute necessity or advantage in acquiring all components at the same time in the general case. For example, the Mediator One component 70 may acquire a component of Class A, Class B, and a Mediator Two component 92. Then at some later time, the Mediator Two component 92 may acquire a component 90 of Class C. One skilled in the art would recognize that these choices were made for the example only and do not restrict the implementation of the process of the present invention.

FIG. 7 illustrates that the Mediator One component 70 may implement some interactions as direct method or operation calls typical of object-oriented programs. In this figure, the Mediator One component 70 is implemented to call methods directly on the Class A component 86 to implement the "invokes" relationship role from the Object Model, for example.

A purpose of this figure is to illustrate the role of Mediator Components within the process of the present invention. The Mediator Components contain implementations of the knowledge of an Object Model. They manage the interactions of other components and provide an implementation for the interactions. The interactions between components are typically represented in the Object Model as relationships in modeling languages, so in this figure the "invokes" relationship role is an interaction between components of the Mediator One class and components of the Class A class. In FIG. 7, a solid line with an arrow represents a method call or operation call typical of object-oriented programming where the direction of the call is indicated by the direction of the arrow. Some relationships between components can be implemented using method calls. One skilled in the art would recognize that the figure represents only one possible choice of implementing the relationships from the Object Model within the Mediator One component 70.

FIG. 8 illustrates that the Mediator One component 70 may implement some interactions as indirect data exchanges or event monitoring. To illustrate this concept, in this figure a Class A component 86 produces an event representing the "Input From" relationship role from the Object Model. This event is recognized by the Mediator One component 70, which then converts the event to an event representing the "Input To" relationship role from the Object Model. The "Input To" event is recognized by the Mediator Two component 92 and is used to start processing to handle that event. A purpose of this figure is to illustrate one possible way in which the Mediator One component 70 may implement interactions from the Object Model as indirect exchanges or events. This concept is important to the invented process because dynamically acquired components may have no knowledge of each other; therefore direct method calls may not be an option for implementing some interactions. This is one way that the process of the present invention differs from conventional object-oriented software systems. In the Object Model of this example, Class A components 86 can interact with Mediator Two components 92, even though Class A components 86 may not have been written with this intention. As long as Class A components 86 produce an "Input From" event that can be detected and converted by Mediator One components 70, the Class A component 86 can fulfill the requirements of the "Input From" relationship role. The Mediator Component can route the events or data representing the required relationships to the appropriate objects according to its knowledge of its Object Model. This allows dynamically acquired components such as Class A components 86 to be used in a system even if the Class A components 86 were not originally written with such an intended use. The purpose of the Mediator Components within the context of this invention is to control, direct, propagate, or route interactions, both direct and indirect, between other software components according to an implementation of knowledge represented by an Object Model. One skilled in the art would recognize that data exchange protocols, events, software bus technology and other mechanisms for implementing indirect component interactions under the control of Mediator Components are choices made for functionality and/or convenience for specific implementations and do not limit the present invention to these alternatives.

FIG. 9 illustrates one possible implementation of Object Model relationships using a combination of direct invocations and indirect techniques such as events or software bus data exchanges. One skilled in the art would recognize that the choices of implementation shown here are chosen for illustration only and do not limit or restrict the choices for implementing any other Object Model's relationships when implementing the present invention. This figure is included for the purpose of continuing discussion of an exemplary use of the present invention.

FIG. 9 uses solid lines with arrows to represent method calls and dashed lines with arrows and rectangular shadowed boxes to represent events or data exchanges. The direction of the arrow represents the direction of the communication exchange.

In this example, the abstract relationship "Mediator One Invokes Class A/Class A Invoked By Mediator One" is implemented as a direct method call by the Mediator One component 70 on the Class A component 86. The Class A component 86 must provide a method call (for example, "InvokeMe") as part of its public interface and if the Mediator One component 70 has an instance of Class A called ComponentA it could then interact with ComponentA by executing a statement such as "ComponentA.Invoke Me( . . . )" where the ellipses in the parenthesis represent possible arguments to the method call. In this example, the implementation of this abstract relationship provides for the interaction to be initiated only by the Mediator One component 70, and the name of the role played by the Class A component 86 in the interaction ("Invoked By" in the Object Model of FIG. 5) suggests that the initiation of the interaction is unidirectional. The role of the Class A component 86 is passive in this relationship, therefore the Class A component 86 does not initiate an interaction in the implementation diagram of FIG. 9.

To continue with the example, the abstract relationship roles "Mediator One Retrieves From Class B" and "Mediator One Stores To Class B" are implemented as direct method calls by the Mediator One component 70 on the Class B component 88, so the Mediator One component 70 initiates the interactions described by the "Retrieves From" and "Stores To" relationship roles. The roles played by the Class B component 88 in these relationships ("Stored To" and "Retrieved From" in the Object Model of FIG. 5) are passive. Similarly, the abstract relationship role "Mediator One Configures Mediator Two" is also implemented as a direct method call by the Mediator One component 70 on the Mediator Two component 92 while the relationship role "Mediator Two Configured By Mediator One" is passive and not shown in the implementation diagram of FIG. 9.

The abstract relationship roles "Class A Input From/Input To Mediator Two" describe the idea that the Class A component 86 can produce data that is used by the Mediator Two component 92. In this case, the interaction is implemented by indirect exchanges using the Mediator One component 70 as a middleman. The Class A component 86 generates an event called "Input From" when it has produced data. This event is intercepted by the Mediator One component 70, as shown by the dashed lines in FIG. 9. Once the Mediator One component 70 has intercepted this event, it knows (because it represents the knowledge of the Object Model of FIG. 5) that an "Input From" event generated by the Class A component 86 means that the Mediator Two component 92 must play the "Input To" role next. In this example, the abstract role "Input To Mediator Two" is implemented as a direct method call from the Mediator One component 70 on Mediator Two component 92. The abstract relationship, shown in the Object Model between the Class A component 86 and the Mediator Two component 92, is actually implemented in FIG. 9 as a two step process mediated by the Mediator One component 70. The Mediator One component 70 changes the event produced by the Class A component 86 into a method call on the Mediator Two component 92, thereby providing the support for the abstract relationship to be implemented indirectly using mediation.

Similarly, the abstract relationship roles "Mediator Two Output From/Output To Class A" describes the idea that the Mediator Two component 92 can produce data that is then used by the Class A component 86. This abstract relationship is implemented in the same way as the "Input From/Input To" but the direction of the interaction is reversed. In the case of the "Output From/Output To" relationship, the Mediator Two component 92 generates the event "Output From" to implement the "Output From" relationship role, and the event is intercepted by the Mediator One component 70. The Mediator One component 70 then calls a method on the Class A component 86 to implement the "Output To" relationship role.

The next set of abstract relationships to consider is the pair "Mediator Two Retrieves From/Retrieved From Class B" and "Mediator Two Stores To/Stored To Class B". In this case, the Class B component 88 is performing a passive role in both relationships shown in the Object Model of FIG. 5. The Mediator Two component 92 initiates both interactions by generating events named "Retrieves From" or "Stores To" as shown in the implementation diagram of FIG. 9. The events are intercepted by the Mediator One component 70, which then uses direct method calls "Retrieves From" and "Stores To" to complete the two step process of mediation. In the example shown in this Object Model in FIG. 5, both the Mediator One component 70 and the Mediator Two component 92 have the same abstract relationships with the Class B component 88 ("Retrieves From" and "Stores To"). The implementation of the abstract relationships is different in FIG. 9, however, because the interaction between the Mediator Two component 92 and the Class B component 88 is a two step process that uses the Mediator One component 70 to the Class B component 88 interaction as its second step. The use of the same methods for implementing different abstract relationships is a simplification for this specific example only, and is explained here for clarification in understanding the purpose of the Mediator Components of the present invention.

The last set of abstract relationships within the Object Model of FIG. 5 are the "Mediator Two Converts To/Converted To Class C" and "Class C Converted From/Converts From Mediator Two" interactions. The Mediator Two component 92 plays an active role in the "Converts To" abstract relationship role so this role is implemented as a direct method call on the Class C component 90. The Class C component 90 plays a passive role in the "Converted To" relationship role so nothing is initiated by the Class C component 90 in the implementation diagram of FIG. 9. Finally, the Class C component 90 plays an active role in the "Converted From" abstract relationship role and as shown in FIG. 9, this role is implemented as an event "Converted From" generated by the Class C component 90 and intercepted by the Mediator Two component 92, the other participant in this relationship. As shown by this final abstract relationship implementation, events of the present invention do not always result in a two step process of event to method call conversion involving mediation. In accordance with the present invention, events may sometimes be intercepted by the other components participating in the abstract relationship.

The purpose of this explanation is to show how the Object Model of FIG. 5 can be mapped to the implementation diagram of FIG. 9. The Object Model of FIG. 5 comprises an arbitrary choice for the purpose of illustrating a use of the present invention, and FIG. 9 is one possible way to implement the example Object Model using direct method invocations and events mediated by the Mediator One component 70. The conversion of a graphically represented Object Model into a Mediator Component was explained in detail to show how the Mediator Component functions within the system to convert knowledge of component interactions into implemented communications between components using both direct invocations such as methods and indirect interactions such as events. One skilled in the art would recognize that the arbitrary choice of Object Model in FIG. 5 and the implementation diagram in FIG. 9, for example, are not particularly important or limiting with respect to the present invention.

Figure 10:
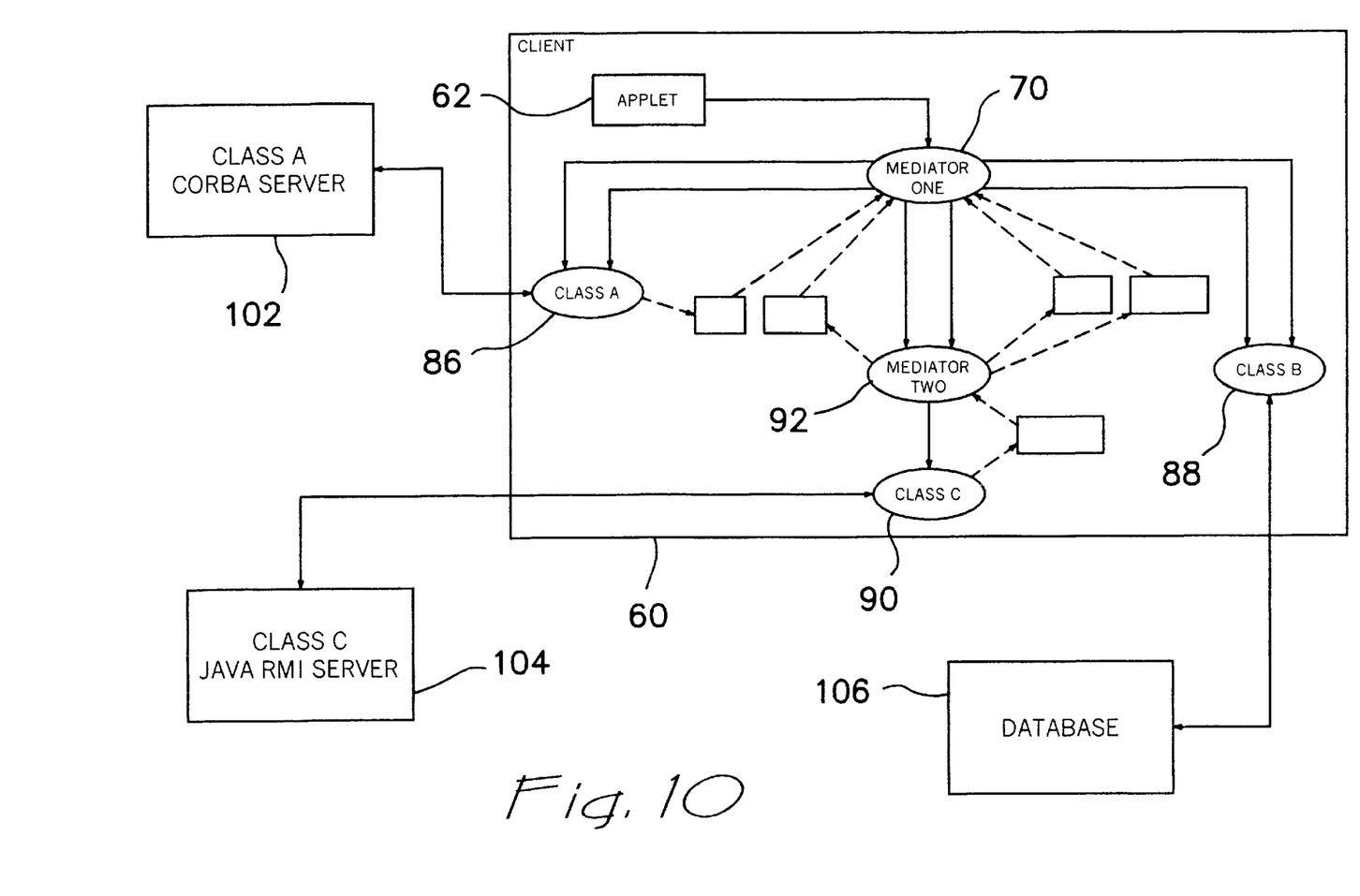
FIG. 10 is an illustration of acquired and assembled components of Class A, Class B, and Class C communicating with remote servers.

FIG. 10 illustrates a subsequent step in the process of the present invention. Participating components 86, 88 and 90 that have been acquired and assembled by the Mediator One component 70 and the Mediator Two component 92 may then establish communications with remote servers. For the purpose of this example, the servers are shown to be a distributed object CORBA server 102, a Java RMI server 104, and a database server 106. Each of the components 86, 88 and 90 may establish communications with one or more of the servers 102, 104, 106 using any networking or communication protocol it was implemented to use, including protocols that are not object-oriented in nature. Each of the components 86, 88 and 90 handles all the details necessary to communicate with the server(s) it requires to implement its function or functions. The details of communication and data exchange for each server are encapsulated within the respective downloaded components 86, 88 and 90. This encapsulation of server information is an important advantage of the present invention over previous methods of client-server communications or architectures. The client can acquire components at execution time to communicate with any type of server. The only restriction is that the components must implement public interfaces recognizable to the acquiring and assembling Mediator Component(s) as classes within the Mediator's Object Model. Since the client can acquire components at execution time, the client can interact with servers and protocols that were unknown at the time the client was designed, an important advantage over the prior art in client-server communications.

The object-oriented public interface presented and used by the Mediator Component to support component interactions is one way that a non-objectoriented external source can be made to appear like a distributed object server. The component communicating with the external source can perform the function of converting data of any arbitrary type into objects for use within the Mediator's Object Model.

Although the Mediator classes are not shown in the illustrated exemplary embodiment as communicating with servers, it should be noted that there is nothing within the invention to restrict mediating components from also establishing communications with servers.

Figure 11:
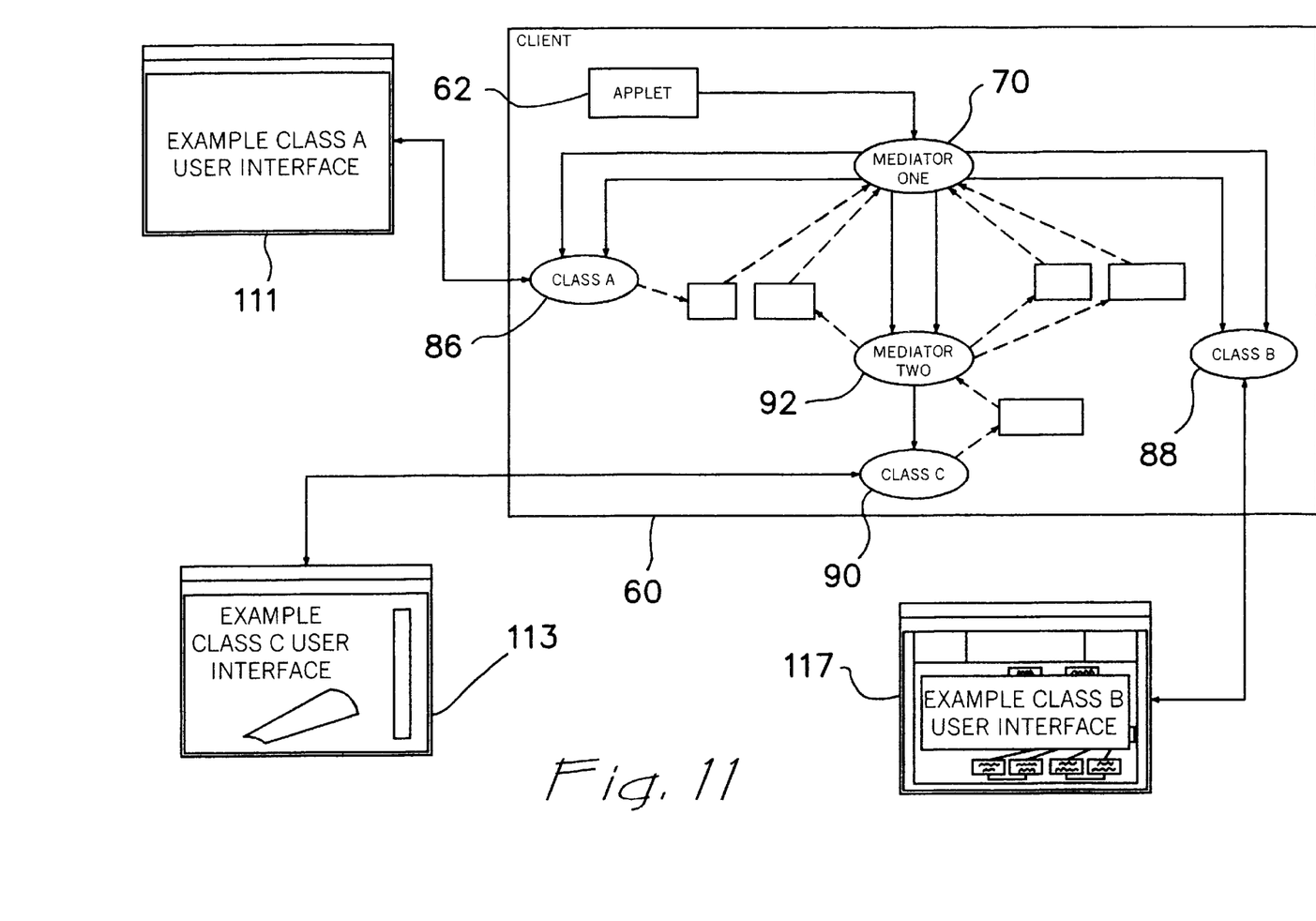
FIG. 11 is an illustration of acquired and assembled components of Class A, Class B, and Class C presenting user interfaces.

FIG. 11 illustrates an advantage of the present invention over the prior art in client-server communications. The components acquired by the client can also provide the user interfaces 111, 113, 117 needed for the user to interact with the servers. The graphical user interface displays necessary to collect information from the user to send to each server or to display the data received from the server is preferably not part of the client applet or Mediator Components. In the prior art, the client programs typically had graphical widget implementation and graphical event handling source code written at design and implementation time that limited the way the user could interact with servers. If a server wanted to pass additional data to the client and the graphical screens in the client program could not display the data, then the client program had to be modified to display the new data. This created coupling between client and server that was determined at design time and was frequently inconvenient when additional features or data was desired. The present invention avoids this problem by delegating any server-specific user interactions to the dynamically acquired and assembled components. The client is therefore less coupled to the server at design time because user interactions are removed from design-time source code.

Although the Mediator classes are not shown in the illustrated example as providing a user interface, it should be noted that there is nothing within the scope of the present invention to restrict mediating components from also providing user interfaces. This may actually be highly desirable in an interactive system where the user is expected to initiate or control the timing of component interactions. In this case, the Mediator Component provides a user interface that allows the user to control the invocation of methods or generation of events or data exchanges.

Programs of the present invention can be constructed at execution time. The present invention implements a concept of a dynamically downloaded Mediator Component to represent knowledge of the object interactions in the system. The present invention further discloses a concept of building layers of Mediators to represent complex systems where each layer may be acquired and assembled at execution time, which enables arbitrarily complex systems to be dynamically constructed. The downloaded components of the present invention can then initiate communications with remote servers or with the user. The dynamically acquired and assembled component programs of the present invention can therefore provide services and features to the user that are completely unknown or unanticipated to the higher layers of assembling mediators.

Although an exemplary embodiment of the invention has been shown and described, many other changes, modifications and substitutions, in addition to those set forth in the above paragraphs, may be made by one having ordinary skill in the art without necessarily departing from the spirit and scope of this invention.

What is claimed is:

1. A method in an object-oriented computer system for acquiring and assembling components at execution time within a networked environment, the assembled components establishing communications with remote networked servers, the assembled components presenting a user interface for interaction with a program user, said method comprising the following steps:

executing a client program capable of acquiring and assembling at least one component at execution time from a networked server;

acquiring at least one component by the client program at execution time from at least one networked server;

assembling the at least one component by the client program at execution time according to implemented knowledge of component classes or types;

the client program mediating component interactions between assembled components according to implemented knowledge of abstract relationships between component classes or types, wherein the abstract relationships are managed by the client program;

establishing communications by the at least one acquired and assembled component with at least one remote server according to encapsulated knowledge of at least one communication protocol; and presenting a user interface by the at least one acquired and assembled component and interacting with the user of the client program for at least one of an encapsulated server-specific data exchange and a presentation requirement.

2. A method in an object-oriented computer system for acquiring and assembling components at execution time within a networked environment, the assembled components providing additional knowledge for acquiring and assembling other components, the assembled components establishing communications with remote networked servers, the assembled components presenting a user interface for interaction with a program user, said method comprising the following steps:

executing a client program capable of acquiring and assembling at least one component at execution time from a networked server;

acquiring by the client program at least one mediating component at execution time from at least one networked server;

instantiating and invoking by the client program the at least one mediating component at execution time according to implemented knowledge of component classes or types;

acquiring by the at least one mediating component at least one additional component at execution time from at least one networked server;

assembling by the at least one mediating component the at least one additional component at execution time according to implemented knowledge of component classes or types;

the at least one mediating component mediating interactions between assembled components according to implemented knowledge of abstract relationships between component classes or types, the abstract relationships being managed by the at least one mediating component;

establishing by the at least one additional component communications with at least one remote server according to encapsulated knowledge of at least one communication protocol; and presenting by the at least one additional component at least one user interface and interacting with the program user of the client program for at least one of an encapsulated server-specific data exchange and a presentation requirement.

3. A method of acquiring components at execution time in a distributed computing environment, comprising the following steps:

executing a client program, the client program having a first encapsulated knowledge of predetermined component classes or types;

the client program acquiring a mediating component from a network server during the execution of the client program, the mediating component having a second encapsulated knowledge of predetermined component classes or types;

instantiating and invoking by the client program the mediating component during the execution of the client program, the mediating component being instantiated and invoked by the client program in accordance with the first encapsulated knowledge of predetermined component classes or types held by the client program;

the mediating component acquiring an additional component from a network server during the execution of the client program; and instantiating and invoking by the mediating component the additional component during the execution of the client program, the additional component being instantiated and invoked by the mediating component in accordance with the second encapsulated knowledge of predetermined component classes or types held by the mediating component.

4. The method as set forth in claim 3, wherein the step of the client program acquiring a mediating component is preceded by a step of the client program acquiring an initializing component from a network server during the execution of the client program.

5. The method as set forth in claim 3, wherein the step of the client program acquiring a mediating component comprises a step of the initializing component acquiring the mediating component from a network server during the execution of the client program.

6. The method as set forth in claim 3, wherein:

the first encapsulated knowledge of predetermined component classes or types comprises a first object model; and the second encapsulated knowledge of predetermined component classes or types comprises a second object model.

7. The method as set forth in claim 3, wherein:

the first encapsulated knowledge of predetermined component classes or types is different from the second encapsulated knowledge of predetermined component classes or types comprises a second object model.

8. The method as set forth in claim 3, wherein the additional component can only be instantiated and invoked by the mediating component and cannot be the instantiated and invoked by the client program.

9. The method as set forth in claim 3, wherein:

the first encapsulated knowledge of predetermined component classes or types facilitates the instantiation and invocation of the mediating component; and the first encapsulated knowledge of predetermined component classes or types does not facilitate the instantiation and invocation of the additional component.

10. The method as set forth in claim 3, wherein the step of instantiating and invoking by the mediating component the additional component is followed by a step of the additional component establishing a communication link with at least one remote server in accordance with the second encapsulated knowledge of predetermined component classes or types.

11. The method as set forth in claim 3, wherein:

the step of the mediating component acquiring an additional component comprises a step of the mediating component acquiring a plurality of additional components from a network server during the execution of the client program; and the step of instantiating and invoking by the mediating component the additional component comprises a step of instantiating and invoking by the mediating component the plurality of additional components during the execution of the client program, the plurality of additional components being instantiated and invoked by the mediating component in accordance with the second encapsulated knowledge of predetermined component classes or types held by the mediating component.

12. The method as set forth in claim 11, wherein the step of instantiating and invoking by the mediating component the plurality of additional components is followed by a step of the plurality of additional components establishing communication links with a plurality of remote servers in accordance with the second encapsulated knowledge of predetermined component classes or types.

13. The method as set forth in claim 12, wherein the step of the plurality of additional components establishing communication links comprises a step of each of the plurality of additional components establishing a communication link with a different remote server.

14. The method as set forth in claim 3, the mediator assuming responsibility for coordinating interactions between the plurality of additional components, wherein at least a portion of the plurality of additional components communicate directly with the mediator component and wherein the mediator component disseminates information and directions in the form of messages and operation calls to the at least a portion of the plurality of additional components.

15. The method as set forth in claim 3, wherein at least one of the plurality of additional components comprises an additional mediator component.

16. The method as set forth in claim 3, and further comprising the following steps:

the mediator component acquires the additional mediating component from a network server during the execution of the client program, the additional mediating component having a third encapsulated knowledge of predetermined component classes or types;

instantiating and invoking by the mediator component the additional mediating component during the execution of the client program, the additional mediating component being instantiated and invoked by the client program in accordance with the second encapsulated knowledge of predetermined component classes or types held by the mediator component;

the additional mediating component acquiring another additional component from a network server during the execution of the client program; and instantiating and invoking by the additional mediating component the other additional component during the execution of the client program, the other additional component being instantiated and invoked by the additional mediating component in accordance with the third encapsulated knowledge of predetermined component classes or types held by the mediating component.

17. A method of acquiring and assembling components at execution time in a distributed computing environment, comprising the following steps:

executing a client program, the client program having a first encapsulated knowledge of predetermined component classes or types;

the client program acquiring a mediating component from a network server during the execution of the client program, the mediating component having a second encapsulated knowledge of predetermined component classes or types;

assembling by the client program the mediating component during the execution of the client program, the mediating component being assembled by the client program in accordance with the first encapsulated knowledge of predetermined component classes or types held by the client program;

the mediating component acquiring an additional component from a network server during the execution of the client program; and assembling by the mediating component the additional component during the execution of the client program, the additional component being assembled by the mediating component in accordance with the second encapsulated knowledge of predetermined component classes or types held by the mediating component.

18. The method as set forth in claim 17, wherein:

the first encapsulated knowledge of predetermined component classes or types comprises a first object model; and the second encapsulated knowledge of predetermined component classes or types comprises a second object model.

19. The method as set forth in claim 17, wherein:

the first encapsulated knowledge of predetermined component classes or types is different from the second encapsulated knowledge of predetermined component classes or types comprises a second object model.

20. The method as set forth in claim 17, wherein the additional component can only be assembled by the mediating component and cannot be assembled by the client program.

21. The method as set forth in claim 17, wherein:

the first encapsulated knowledge of predetermined component classes or types facilitates the assembling of the mediating component; and the first encapsulated knowledge of predetermined component classes or types does not facilitate the assembling of the additional component.

22. The method as set forth in claim 17, wherein the step of the client program acquiring a mediating component is preceded by a step of the client program acquiring an initializing component from a network server during the execution of the client program.

23. The method as set forth in claim 22, wherein the step of the client program acquiring a mediating component comprises a step of the initializing component acquiring the mediating component from a network server during the execution of the client program.

24. The method as set forth in claim 17, wherein the step of the at least one component establishing a communication link with at least one remote server comprising a step of the at least one component establishing a communication link with a plurality of remote servers in accordance with encapsulated knowledge of a plurality of communication protocols.

25. The method as set forth in claim 17, wherein the step of assembling the at least one component comprises a step of assembling the at least one component in accordance with an implemented knowledge of component classes and types.

26. The method as set forth in claim 17, and further comprising the following steps:

the at least one component presenting a user interface; and the at least one component interfacing with a user of the client program.

27. The method as set forth in claim 26, wherein the step of the at least one component interfacing with a user of the client program comprises a step of the at least one component interfacing with a user of the client program in order to enable an encapsulated server-specific data exchange.

28. The method as set forth in claim 26, wherein the step of the at least one component interfacing with a user of the client program comprises a step of the at least one component interfacing with a user of the client program in order to facilitate a presentation requirement.

29. The method as set forth in claim 17, wherein the step of assembling the at least one component comprises a step of assembling the at least one component in accordance with an object model.

30. The method as set forth in claim 29, wherein the step of assembling the at least one component comprises a step of the client program assembling the at least one component being assembled by the client program in accordance with implemented knowledge of component classes or types held by the client program.

* * * * *